(12) United States Patent
Keum et al.

(10) Patent No.: US 12,291,130 B2
(45) Date of Patent: May 6, 2025

(54) SEAT CUSHION EXTENSION DEVICE OF FOLD AND DIVE SEAT

(71) Applicants: Hyundai Motor Company, Seoul (KR); Kia Corporation, Seoul (KR)

(72) Inventors: Dong Hoon Keum, Busan (KR); Sang Do Park, Suwon-Si (KR); Sang Soo Lee, Hwaseong-Si (KR); Hoon Bok Lee, Hwaseong-Si (KR); Mu Young Kim, Osan-Si (KR); Chan Ho Jung, Gunpo-Si (KR); Da Eun Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 387 days.

(21) Appl. No.: 18/079,337

(22) Filed: Dec. 12, 2022

(65) Prior Publication Data
US 2024/0075850 A1  Mar. 7, 2024

(30) Foreign Application Priority Data
Sep. 6, 2022 (KR) .................. 10-2022-0112550

(51) Int. Cl.
| | |
|---|---|
| *B60N 2/02* | (2006.01) |
| *B60N 2/12* | (2006.01) |
| *B60N 2/16* | (2006.01) |
| *B60N 2/18* | (2006.01) |
| *B60N 2/30* | (2006.01) |

(52) U.S. Cl.
CPC ............ *B60N 2/02246* (2023.08); *B60N 2/12* (2013.01); *B60N 2/1625* (2013.01); *B60N 2/1821* (2013.01); *B60N 2/3065* (2013.01)

(58) Field of Classification Search
CPC ............... B60N 2/1625; B60N 2/1821; B60N 2/02246; B60N 2/3065; B60N 2/3031; B60N 2/12; B60N 2/186; B60N 2/2236; B64D 11/064; B64D 11/0639; B64D 11/06395

See application file for complete search history.

(56) References Cited

U.S. PATENT DOCUMENTS

| | | | | |
|---|---|---|---|---|
| 2,926,951 | A * | 3/1960 | Koplin ................. | B60N 2/3065 297/125 |
| 2,927,818 | A * | 3/1960 | Ferrara ................ | B60N 2/3031 297/125 |

(Continued)

*Primary Examiner* — Syed A Islam
(74) *Attorney, Agent, or Firm* — Banner & Witcoff, Ltd.

(57) ABSTRACT

The present disclosure provides a seat cushion extension device for a fold-and-dive seat. The seat cushion extension device may include a pair of seat cushion side frames arranged at a predetermined interval, a seatback frame rotatably connected to the pair of seat cushion side frames and having a guide pin formed on an outer surface thereof, a seat cushion frame, a pair of links rotatably connected between the pair of seat cushion side frames and a front end of the seat cushion frame, and a pair of extension frames. Each of the pair of extension frames may have a front end connected to the seat cushion frame, and a rear end formed with a guide hole, into which a guide pin may be inserted. The seat cushion extension device may facilitate a forward extension of a seat cushion regardless of a position of a seatback of the fold-and-dive seat.

13 Claims, 7 Drawing Sheets

(56) References Cited

U.S. PATENT DOCUMENTS

| | | | | |
|---|---|---|---|---|
| 3,572,829 A * | 3/1971 | Malitte | ............... | B64D 11/06 |
| | | | | 297/317 |
| 4,687,250 A * | 8/1987 | Esche | ............... | B60N 2/504 |
| | | | | 297/303.4 |
| 6,578,917 B1 * | 6/2003 | Aubert | ............... | B60N 2/42736 |
| | | | | 297/362.11 |
| 6,641,214 B2 * | 11/2003 | Veneruso | ............... | B60N 2/02246 |
| | | | | 297/343 |
| 7,703,851 B2 * | 4/2010 | Nakaya | ............... | B60N 2/34 |
| | | | | 297/344.15 |
| 8,251,450 B2 * | 8/2012 | Carroll | ............... | B60N 2/01583 |
| | | | | 297/331 |
| 9,701,221 B2 * | 7/2017 | Nagayasu | ............... | B60N 2/22 |
| 11,254,245 B2 * | 2/2022 | Epaud | ............... | B60N 2/02246 |
| 11,279,260 B2 * | 3/2022 | Kim | ............... | B60N 2/3013 |
| 11,453,314 B2 * | 9/2022 | Kim | ............... | B60N 2/02246 |
| 11,524,609 B2 * | 12/2022 | Ghalsasi | ............... | B60N 2/206 |
| 11,618,351 B2 * | 4/2023 | Kim | ............... | B60N 2/02246 |
| | | | | 297/362 |
| 11,772,524 B2 * | 10/2023 | Roche | ............... | B60N 2/06 |
| | | | | 297/344.1 |
| 11,952,126 B2 * | 4/2024 | Parker | ............... | B60N 2/0745 |
| 12,024,066 B2 * | 7/2024 | Kim | ............... | B60N 2/1625 |
| 2005/0017561 A1 * | 1/2005 | Burmeister, III | ............... | B60N 2/02246 |
| | | | | 297/354.12 |
| 2010/0225151 A1 * | 9/2010 | Michalak | ............... | B60N 2/22 |
| | | | | 297/344.1 |
| 2023/0049867 A1 * | 2/2023 | Jung | ............... | B60N 2/02246 |

* cited by examiner

SEAT CUSHION EXTENSION DEVICE OF FOLD AND DIVE SEAT

CROSS-REFERENCE TO RELATED APPLICATION

This application claims the benefit of priority to Korean Patent Application No. 10-2022-0112550, filed on Sep. 6, 2022, the entire content of which is incorporated herein by reference.

BACKGROUND

(a) Technical Field

The present disclosure relates to a seat cushion in a vehicle, and more specifically to a seat cushion extension device of a fold-and-dive seat.

(b) Background Art

A fold-and-dive seat for a vehicle refers to a seat capable of a folding operation of having its seatback being folder over a seat cushion to have an expanded loading space in a cargo area when long items and the like are loaded in the cargo area behind the seatback, and also capable of a dive operation having a front portion of the seat cushion being moved down to make a back surface of the folded seatback horizontal.

SUMMARY

The present disclosure has been made in efforts to solve the conventional problem and an object of the present disclosure is to provide a seat cushion extension device for a fold-and-dive seat, which may extend a seat cushion forward to fit a passenger's body shape regardless of a position of a seatback of the fold-and-dive seat and implement a relaxation posture by the forward extension of the seat cushion at the same time as a reclining operation of the seatback.

To achieve this objective and others, in accordance with one aspect of the present disclosure, a seat cushion extension device for a fold-and-dive seat may include a pair of seat cushion side frames spaced apart from each other at a first interval, a seatback frame rotatably connected to the pair of seat cushion side frame and having a guide pin formed on an outer surface of the seatback frame, a seat cushion frame having a front end, a pair of links rotatably connected between a respective one of the pair of seat cushion side frames and the front end of the seat cushion frame, and a pair of extension frames. The pair of extension frames may each have a front end connected to the seat cushion frame, and a rear end with a guide hole for receiving a respective on of the pair of guide pins.

Each of the pair of guide pins may be inserted into the guide hole of a respective one of the pair of extension frames. Each of the pair of guide pins may be formed to protrude from a gap maintenance bracket mounted on a respective outer lateral surface of the seatback frame.

The guide hole of each extension frame of the pair of extension frames may be formed to be inclined at an upper rear end of the each extension frame.

The guide hole of each extension frame of the pair of extension frames may be formed as an elongated hole inclined upward toward a rear of the seat cushion extension device such that the seat cushion frame and the each extension frame extend forward while the each extension frame has a rising inclination toward the seat cushion frame.

A lower end of each link of the pair of links may be hinge-fastened to a front end of a respective one of the pair of seat cushion side frames. An upper end of the each link may be hinge-fastened to a respective one of a pair of support links formed on a bottom surface of the front end of the seat cushion frame.

Each link of the pair of links may be arranged to be inclined upward at a predetermined angle toward a rear of the seat cushion extension device while the seat cushion frame and the pair of extension frames are not in a forward extension position.

The each link may push up the respective one of the pair of support links of the seat cushion frame and be rotated forward to be arranged to stand upright while the seat cushion frame and the pair of extension frames are in a forward extension position.

The each link may be rotated forward, upon a dive operation of the seat cushion frame and a respective one of the pair of extension frames, to pull down the respective one of the pair of support links and be arranged to be inclined upward at a predetermined angle toward a front of the seat cushion extension device.

The seat cushion extension device for the fold-and-dive seat may further include a first motor connected to at least one of the pair of links for a rotation operation of the at least one of the pair of links, and a second motor for a rotation operation of the seatback frame.

The first motor may include a lead screw that is hinge-connected to a fixing bracket mounted on the at least one of the pair of links. The lead screw may be a gearbox output shaft of the first motor.

The second motor may include a gearbox fastened to a rotational shaft rotatably connecting the seatback frame to the pair of seat cushion side frames so as to apply a rotational force.

The seat cushion extension device for the fold-and-dive seat may further include a controller configured to, at any given time, drive only the first motor for an extension operation of the seat cushion frame, or drive only the second motor for a reclining operation of the seatback frame.

The seat cushion extension device for the fold-and-dive seat may further include a controller configured to simultaneously drive the first motor and the second motor for implementing a fold-and-dive operation and a relaxation posture.

Through the above configuration, the present disclosure may provide the following effects.

First, it may be possible to disperse the body pressure and decrease the fatigue for the lower body including the passenger's hips and thighs by extending the seat cushion forward to fit the passenger's body shape regardless of the position of the seatback of the fold-and-dive seat.

Second, it may be possible to provide convenience for the passenger to sleep and rest in the comfortable posture by implementing the relaxation posture which is the weightless posture by the forward extension of the seat cushion at the same time as the reclining operation of the seatback.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
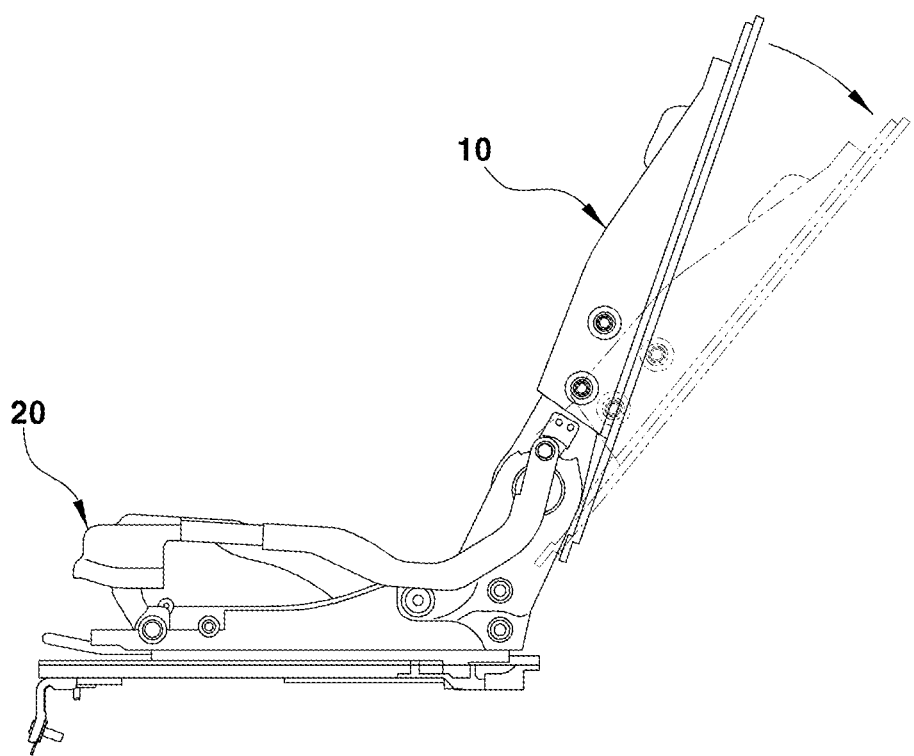
FIGS. 1 and 2 are schematic views showing an example fold-and-dive seat.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, a preferred embodiment of the present disclosure will be described in detail with reference to the accompanying drawings.

Figure 2:
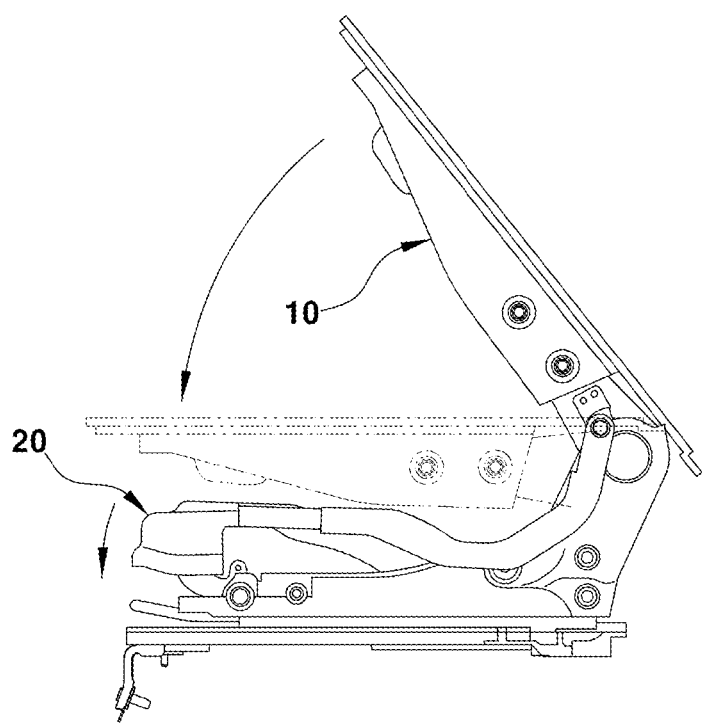

FIGS. 1 and 2 are schematic views showing an example fold-and-dive seat. In an example fold-and-dive seat, as shown in FIG. 1, the rearward reclining of a seatback 10 may be adjusted by a reclining mechanism in a basic posture, and at this time, the seat cushion 20 is maintained in the basic posture.

In addition, in the example fold-and-dive seat, as shown in FIG. 2, when the seatback 10 is folded, the dive operation of moving down the front portion of the seat cushion may be performed by the fold-and-dive mechanism to make a back surface of the seatback 10 horizontal.

However, in the example fold and dive seat as described above, a seatback reclining mechanism may be combined with the fold-and-dive mechanism to provide comfort such that a passenger may further lean an upper body back when the seatback is reclined rearward. However, because the seat cushion is maintained in a fixed position, the body pressure on the passenger's hips and thighs may not be properly dispersed, thereby increasing the fatigue of the passenger's lower body portion.

Figure 3:
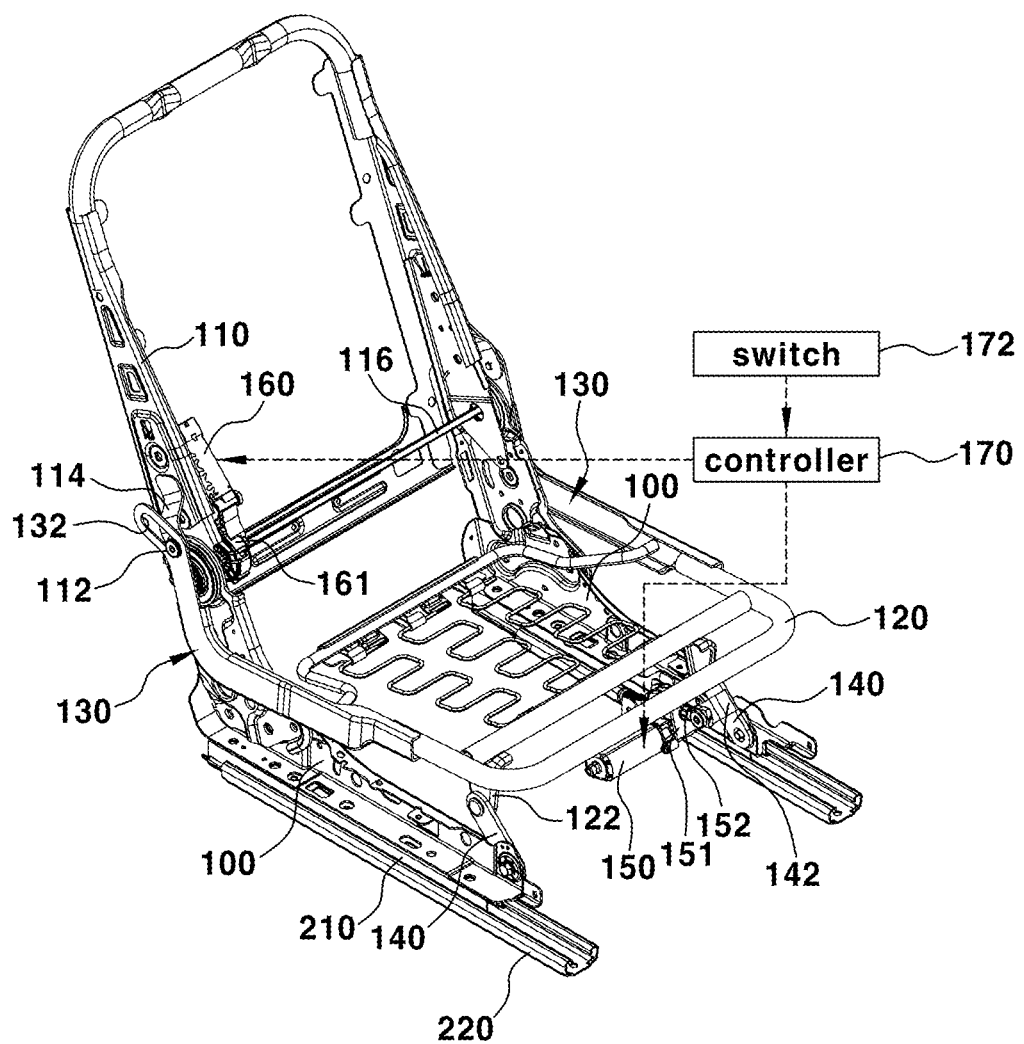
FIGS. 3 and 4 are perspective views showing an example seat cushion extension device of a fold-and-dive seat.
Figure 4:
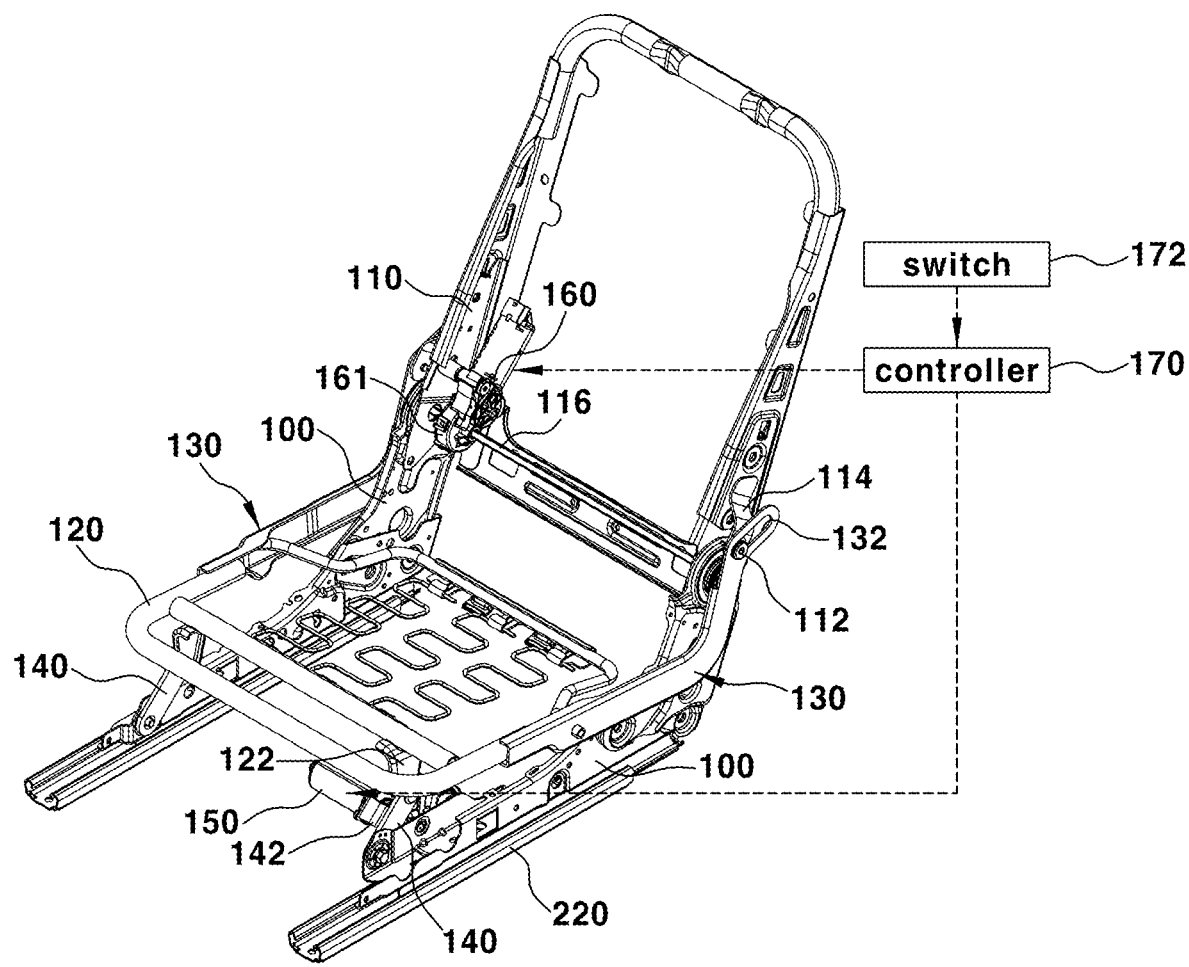

FIGS. 3 and 4 are perspective views showing an example seat cushion extension device of a fold-and-dive seat.

The fold-and-dive seat may include a pair of seat cushion side frames 100 arranged on the left and right sides at a predetermined interval and a seatback frame 110 rotatably fastened to a rear end of the seat cushion side frame 100.

A movable rail 210 may be mounted on a lower portion of the seat cushion side frame 100, and the movable rail 210 may be fastened to a fixed rail 220 fixed to a floor panel to move forward or backward, and thus the front and rear position of the seat may be adjusted.

In addition, the seatback frame 110 may be rotatably fastened to the rear end of the seat cushion side frame 100 by a rotational shaft 116, and thus the forward or backward reclining rotation of the seatback frame 110 may be performed.

In particular, the seat cushion frame 120 may be connected to a front end of the seat cushion side frame 100 to extend and move up and down by a link (e.g., a dive link 140). An extension frame 130 may be connected between the seatback frame 110 and the seat cushion frame 120.

The extension frame 130 may be manufactured by integrating a portion extending in the front-rear direction for connection with the seat cushion frame 120 and a portion extending vertically for connection with the seatback frame 110 at a predetermined angle.

A front end of the extension frame 130 manufactured as described above may be integrally connected with the rear end of the seat cushion frame 120, and a guide hole 132 may be formed in a rear end thereof.

In other words, the guide hole 132 of the extension frame 130 may be formed to be inclined at an upper rear end position of the extension frame 130.

More specifically, a front end of the portion extending in the front-rear direction of the extension frame 130 may be integrally connected with the rear end of the seat cushion frame 120 through welding or the like, and the guide hole 132 may be formed to pass through an upper end of the portion extending in the vertical direction of the extension frame 130.

For the connection between the extension frame 130 and the seatback frame 110, a guide pin 112 formed on an outer surface (e.g., outer lateral surface) of the seatback frame 110 may be movably inserted into the guide hole 132 of the extension frame 130.

The guide pin 112 may be formed to protrude from a gap maintenance bracket 114 mounted on the outer surface (e.g., outer lateral surface) of the seatback frame 110 and inserted into the guide hole 132 of the extension frame 130.

In other words, the gap maintenance bracket 114 mounted on the outer surface of the seatback frame 110 may be formed to bend outward, and the guide pin 112 may be formed to protrude from the outer surface of the gap maintenance bracket 114 to be inserted into the guide hole 132 of the extension frame 130, and thus a gap between the extension frame 130 and the seatback frame 110 and a gap between the extension frame 130 and the seat cushion side frame 100 may be maintained at a level which does not come into direct contact with each other.

The guide hole 132 of the extension frame 130 may be formed in the form of an elongated hole inclined upward toward the rear so that the seat cushion frame 120 and the extension frame 130 extend forward while having a rising inclination.

Figure 5:
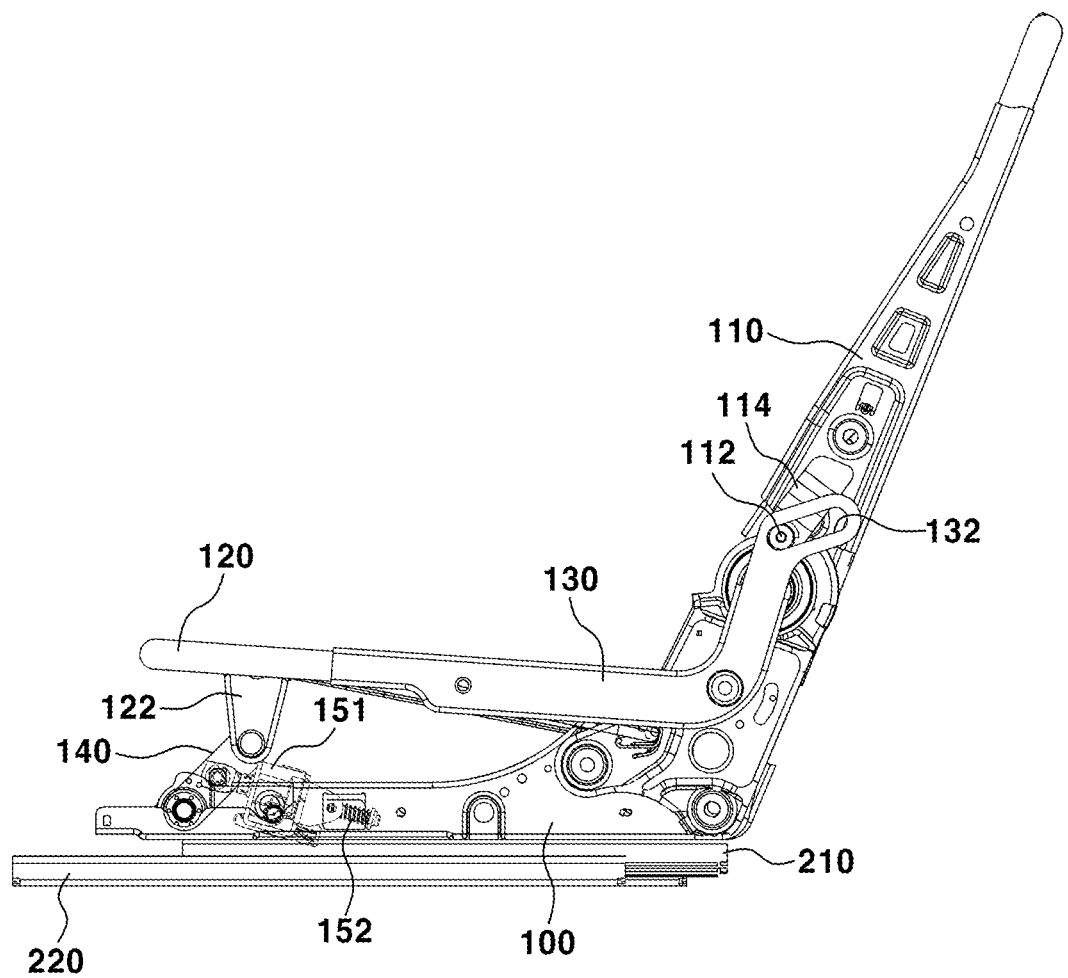
FIG. 5 is a side view showing a state before an operation of a seat cushion extension of an example fold-and-dive seat.
Figure 6:
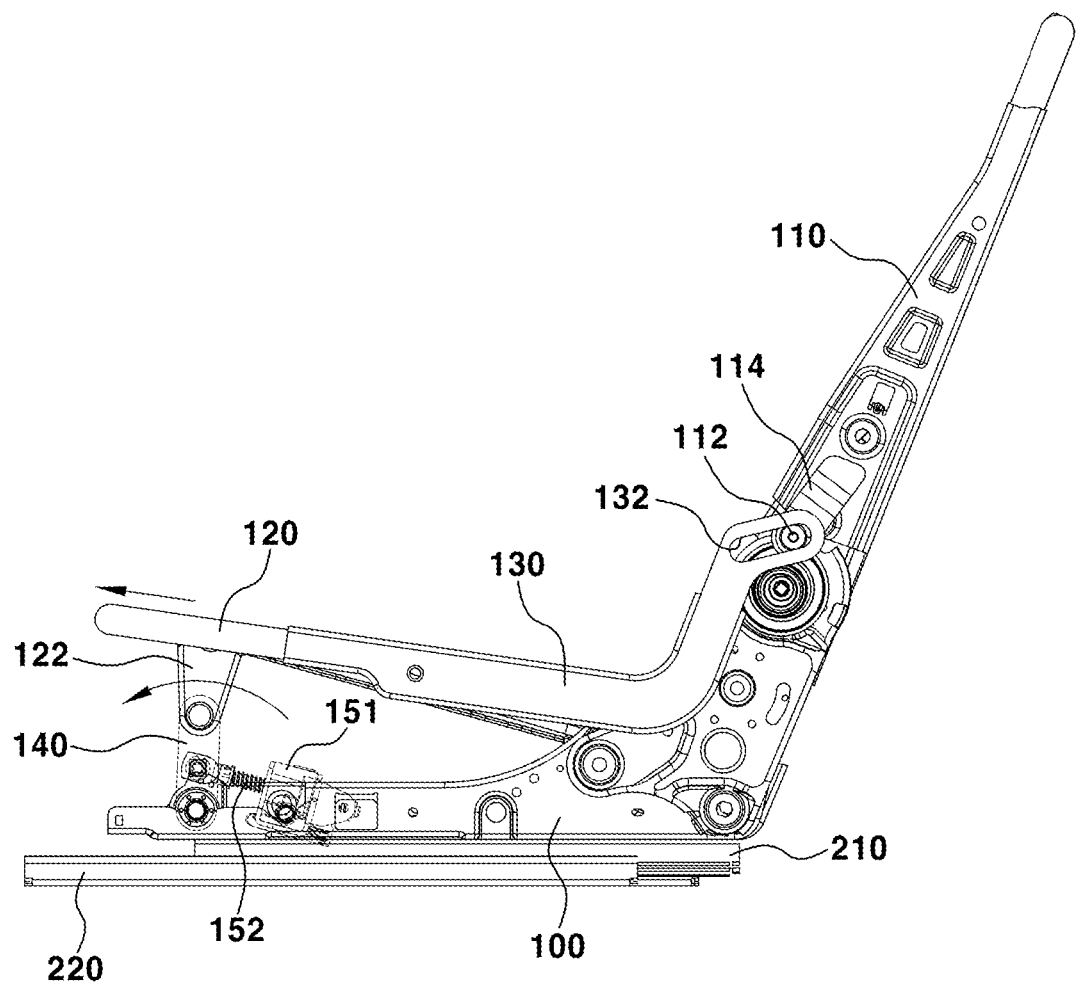
FIG. 6 is a side view showing a state after the operation of a seat cushion extension of an example fold-and-dive seat.

Therefore, as shown in FIG. 5, when the seat cushion frame 120 and the extension frame 130 are not in their forward extension positions, the guide pin 112 may be positioned at the frontmost lower portion of the guide hole 132, whereas as shown in FIG. 6, when the seat cushion frame 120 and the extension frame 130 are in their forward extension positions, the guide pin 112 may be positioned at the rearmost upper portion of the guide hole 132.

A dive link 140 may be rotatably connected between a front end of the seat cushion side frame 100 and a front end of the seat cushion frame 120.

To this end, a lower end of the dive link 140 may be hinge-fastened to an inner surface of the front end of the seat cushion side frame 100, and an upper end thereof may be hinge-fastened to a support link 122 formed on a bottom surface portion of the front end of the seat cushion frame 120.

A first motor 150 may be connected to the dive link 140 for a rotation operation of the dive link 140, and a second motor 160 may be connected to the rotational shaft 116 for a rotation operation of the seatback frame 110.

For example, a lead screw 152 may be fastened to an output gear (not shown) in a gearbox 151, which may be a reduction unit of the first motor 150, to move forward or backward, and the front end of the lead screw 152 may be hinge-connected to a fixing bracket 142 mounted on an inner portion of the dive link 140, and thus the dive link 140 may be rotated forward while being pushed forward when the lead screw 152 moves forward by driving the first motor 150, and the dive link 140 may be rotated backward while being pulled backward when the lead screw 152 moves backward by driving the first motor 150.

In addition, the rotational shaft 116 of the seatback frame 110 may be inserted into and pass through the gearbox 161, which is a reduction unit part of the second motor 160, and spline-coupled with an output gear (not shown) in the gearbox 161, and thus the seatback frame 110 may be rotated forward or backward by the forward or backward rotation of the rotational shaft 116 according to the driving of the second motor 160.

Only the first motor 150 may be driven by the control of the controller 170 when a switch 172 for the forward extension operations of the seat cushion frame 120 and the extension frame 130 is operated, and only the second motor 160 may be driven by the control of the controller 170 when the switch 172 for the reclining operation of the seatback frame 110 is operated. Alternatively, the first motor 150 and the second motor 160 may be simultaneously driven by the control of the controller 170 when the switch 172 for implementing the fold-and-dive operation and the relaxation posture is operated. The controller 170 may be, for example, a computing device such as a microprocessor.

Here, the operation flow for the seat cushion extension device of the fold-and-dive seat composed of the above configuration will be described as follows.

FIGS. 5 and 6 are side views showing the state before and after the operation of the seat cushion extension of the fold-and-dive seat, respectively.

As shown in FIG. 5, before the forward extension movement of the seat cushion frame 120 and the extension frame 130, the dive link 140 may be arranged to be inclined upward at a predetermined angle toward the rear.

In addition, before the forward extension operations of the seat cushion frame 120 and the extension frame 130, the guide pin 112 of the seatback frame 110 may be positioned on the frontmost lower portion of the guide hole 132 of the extension frame 130.

If the passenger selects and operates the switch 172 for the forward extension operations of the seat cushion frame 120 and the extension frame 130, the controller 170 receiving a switching signal of the switch 172 may perform control of applying a current to the first motor 150 to drive the first motor 150.

Subsequently, when the dive link 140 is pushed forward as the lead screw 152 is advanced according to the driving of the first motor 150, as shown in FIG. 6, the dive link 140 may be pushed forward and rotated forward about a hinge-fastening point connected to the seat cushion side frame 100.

Therefore, as shown in FIG. 6, the dive link 140 may push up the support link 122 of the seat cushion frame 120 and may be rotated forward to be arranged to stand upright, and thus the forward extension operations of the seat cushion frame 120 and the extension frame 130 may be performed.

The guide hole 132 of the extension frame 130 may be formed in the form of an elongated hole inclined upward toward the rear so that the seat cushion frame 120 and the extension frame 130 may extend forward while having a rising inclination. Thus, after the forward extension operations of the seat cushion frame 120 and the extension frame 130, the guide pin 112 of the seatback frame 110 may be positioned on the rearmost upper portion of the guide hole 132 of the extension frame 130.

As described above, by allowing the seat cushion to extend forward to fit the passenger's body shape, it may be possible to disperse the body pressure and decrease the fatigue for the passenger's lower body including hips and thighs.

Figure 7:
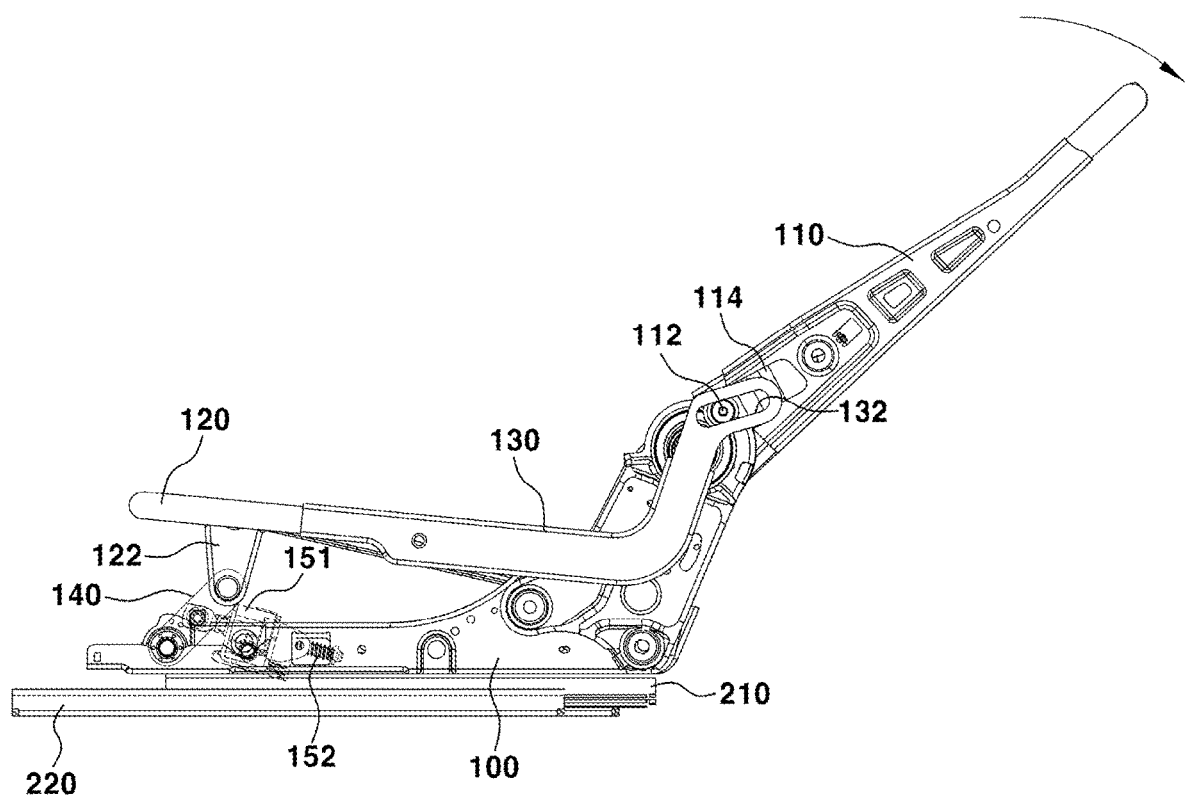
FIG. 7 is a side view showing a seatback in a rearward recline position before the seat cushion extension operation in an example fold-and-dive seat.
Figure 8:
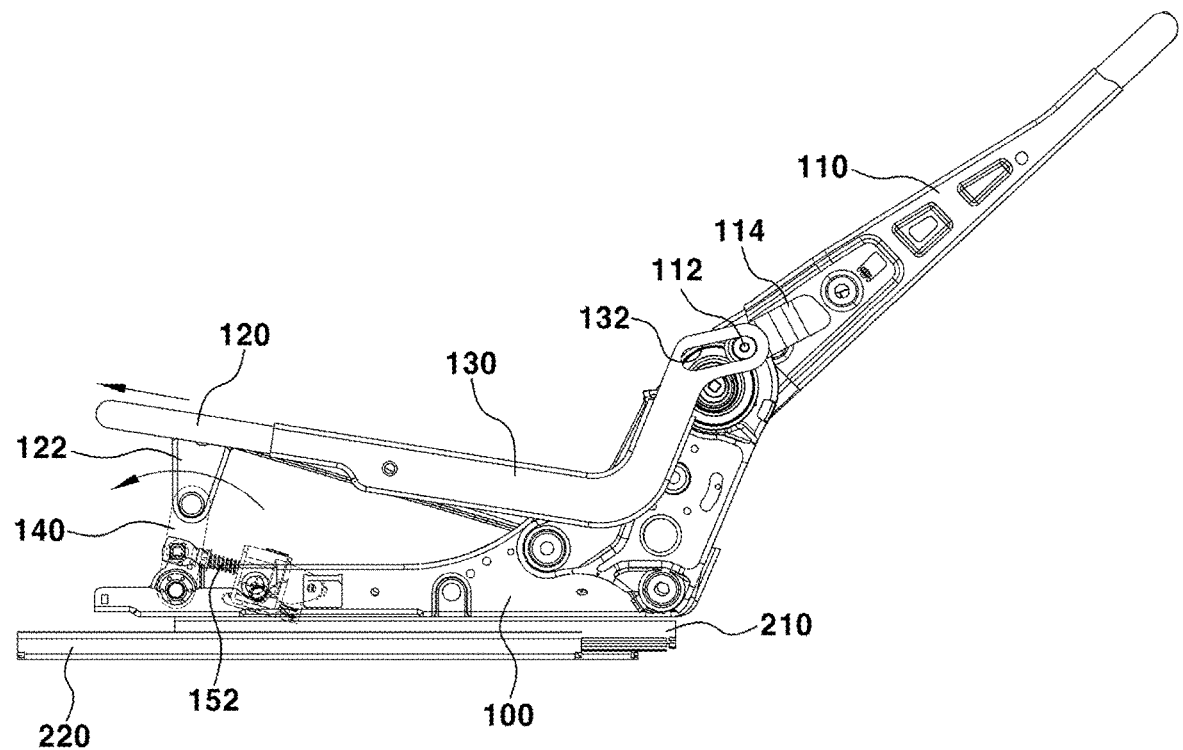
FIG. 8 is a side view showing a seat cushion extension operation being performed in a seatback rearward recline position of an example fold-and-dive seat.

FIG. 7 is a side view showing a seatback in a rearward recline position before the seat cushion extension operation in an example fold-and-dive seat, and FIG. 8 is a side view showing a seat cushion extension operation being performed in a seatback rearward recline position of an example fold-and-dive seat.

If the passenger selects and operates the switch 172 for the reclining operation of the seatback frame 110, the controller 170 receiving the switching signal of the switch 172 may perform the control of applying the current to the second motor 160 to drive the second motor 160.

Subsequently, according to the driving of the second motor 160, the rotational shaft 116 spline-coupled to the output gear (not shown) in the gearbox 161 of the second motor 160 may rotate backward, and the seatback frame 110 coupled to the rotational shaft 116 may be reclined rearward.

The seat cushion extension operation may be performed even in the rearward recline position of the seatback.

To this end, if the passenger selects and operates the switch 172 for the forward extension operations of the seat cushion frame 120 and the extension frame 130, the controller 170 receiving the switching signal of the switch 172 may perform the control of applying the current to the first motor 150 to drive the first motor 150.

Subsequently, when the dive link 140 is pushed forward as the lead screw 152 is advanced according to the driving of the first motor 150, as shown in FIG. 8, the dive link 140 may be pushed forward and rotated forward about a hinge-fastening point connected to the seat cushion side frame 100.

Therefore, as shown in FIG. 8, the dive link 140 may push up the support link 122 of the seat cushion frame 120 and may be rotated forward to be arranged to stand upright, and thus the forward extension operations of the seat cushion frame 120 and the extension frame 130 may be performed.

The guide hole 132 of the extension frame 130 may be formed in the form of an elongated hole inclined upward toward the rear so that the seat cushion frame 120 and the extension frame 130 extend forward while having a rising inclination, and thus after the forward extension operations of the seat cushion frame 120 and the extension frame 130, the guide pin 112 of the seatback frame 110 may be positioned on the rearmost upper portion of the guide hole 132 of the extension frame 130.

As described above, by allowing the seat cushion to extend forward to fit the passenger's body shape even in the state in which the seatback of the fold-and-dive seat is reclined rearward, it may be possible to disperse the body pressure and decrease the fatigue for the passenger's lower body including hips and thighs.

Figure 9:
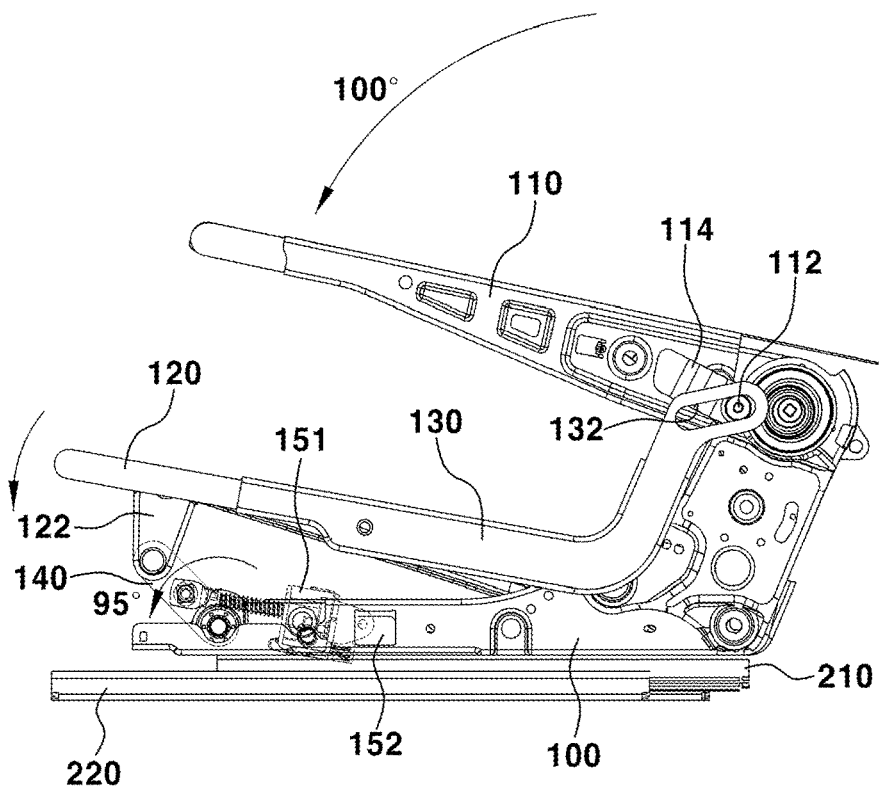
FIG. 9 is a side view showing the seatback folding and seat cushion dive operations of an example fold-and-dive seat.

FIG. 9 is a side view showing the seatback folding and seat cushion dive operations of an example fold-and-dive seat.

If the user selects and operates the switch 172 for implementing the fold-and-dive function including seatback folding and seat cushion dive operations, the first motor 150 and the second motor 160 may be simultaneously driven by the control of the controller 170.

Subsequently, according to the driving of the second motor 160, the rotational shaft 116 spline-coupled to the output gear (not shown) in the gearbox 161 of the second motor 160 may rotate forward and the folding operation (e.g., the rotation of about 100° from the original position) of the seatback frame 110 coupled with the rotational shaft 116 may be performed.

In addition, after the lead screw 152 advances and pushes the dive link 140 forward according to the driving of the first motor 150, as shown in FIG. 9, the dive link 140 may be pushed forward and rotated forward (e.g., rotated by about 95° from the original position) about the hinge-fastening point connected to the seat cushion side frame 100.

Therefore, as shown in FIG. 9, the dive link 140 may be rotated to the maximum forward and arranged to be inclined upward at a predetermined angle toward the front, and thus the dive operation in which the seat cushion frame 120 and the extension frame 130 move down to a lower position than the original position by a predetermined distance may be performed.

As described above, it may be possible to easily perform the folding operation of folding the seatback over the seat cushion due to the insufficient loading space in the cargo area, and the dive operation of moving down the front portion of the seat cushion to make the back surface of the folded seatback a horizontal plane.

Figure 10:
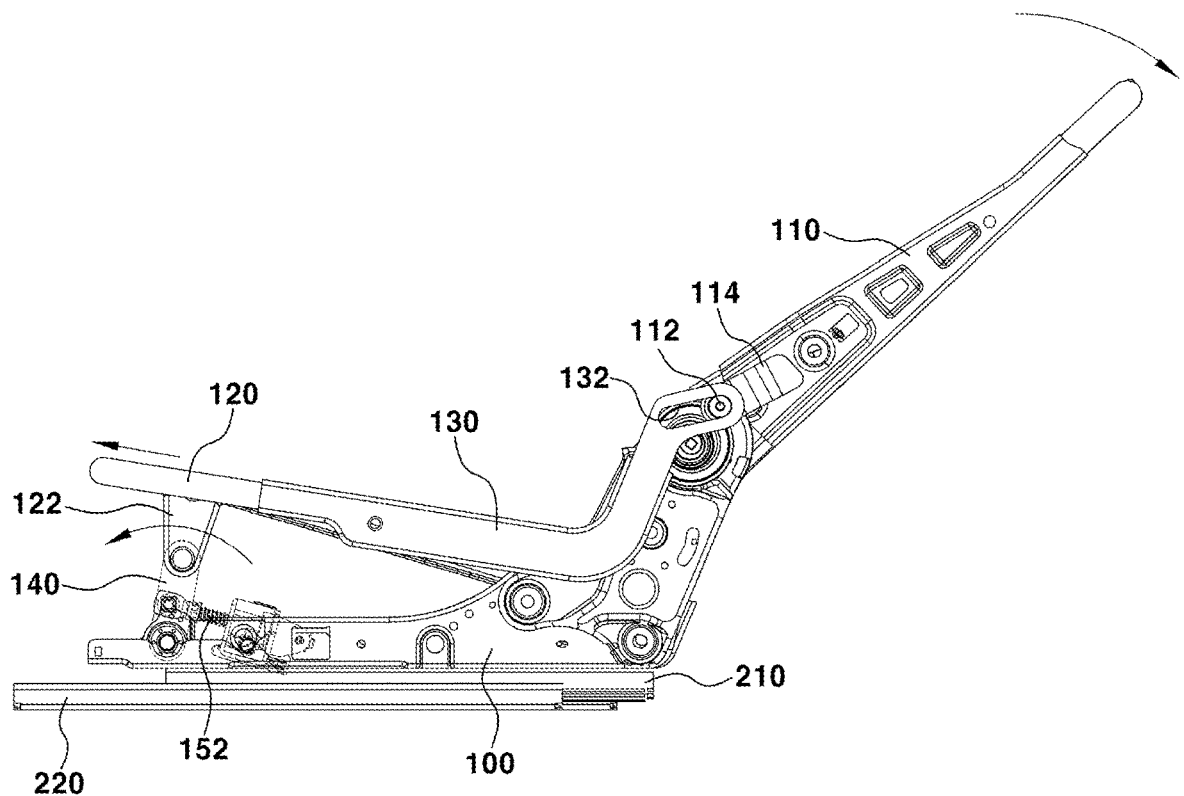
FIG. 10 is a side view showing the seatback rearward reclining and seat cushion extension operations being performed at the same time to implement the relaxation posture of an example fold-and-dive seat.

FIG. 10 is a side view showing the seatback rearward reclining and seat cushion extension operations being performed at the same time to implement the relaxation posture of an example fold-and-dive seat.

If the passenger selects and operates the switch 172 for implementing the relaxation posture, the first motor 150 and the second motor 160 may be simultaneously driven by the control of the controller 170.

After the lead screw 152 advances and pushes the dive link 140 forward according to the driving of the first motor 150, as shown in FIG. 10, the dive link 140 may be pushed forward and rotated forward around the hinge-fastening point connected to the seat cushion side frame 100.

Therefore, as shown in FIG. 10, the dive link 140 may push up the support link 122 of the seat cushion frame 120 and may be rotated forward to be arranged to stand upright, and thus the forward extension operations of the seat cushion frame 120 and the extension frame 130 may be performed.

According to the driving of the second motor 160, the rotational shaft 116 spline-coupled to the output gear (not shown) in the gearbox 161 of the second motor 160 may rotate rearward, and the seatback frame 110 coupled to the rotational shaft 116 may be reclined rearward.

As described above, by allowing the relaxation posture (e.g., a weightless posture) to be implemented by the forward extension of the seat cushion at the same time as the reclining operation of the seatback, it may be possible to provide convenience for the passenger to sleep and/or rest in a comfortable posture.

Although the present disclosure has been described above in detail for each embodiment, the scope of the present disclosure is not limited to each embodiment described above, and various modifications and improvements by those skilled in the art using the basic concept of the present disclosure as defined in the appended claims below will also be included in the scope of the present disclosure.

What is claimed is:

1. A seat cushion extension device for a fold-and-dive seat, the seat cushion extension device comprising:
    a pair of seat cushion side frames spaced apart from each other at a first distance;
    a seatback frame rotatably connected to the pair of seat cushion side frames and having a pair of guide pins each disposed on a respective outer lateral surface of the seatback frame;
    a seat cushion frame having a front end;
    a pair of links each rotatably connected between a respective one of the pair of seat cushion side frames and the front end of the seat cushion frame; and
    a pair of extension frames each having:
        a front end connected to the seat cushion frame, and
        a rear end with a guide hole for receiving a respective one of the pair of guide pins.

2. The seat cushion extension device for the fold-and-dive seat of claim 1, wherein each of the pair of guide pins is inserted into the guide hole of a respective one of the pair of extension frames, and wherein each of the pair of guide pins is formed to protrude from a gap maintenance bracket mounted on a respective outer lateral surface of the seatback frame.

3. The seat cushion extension device for the fold-and-dive seat of claim 1, wherein the guide hole of each extension frame of the pair of extension frames is formed to be inclined at an upper rear end of the each extension frame.

4. The seat cushion extension device for the fold-and-dive seat of claim 1, wherein the guide hole of each extension frame of the pair of extension frames is formed as an elongated hole inclined upward toward a rear of the seat cushion extension device such that the seat cushion frame and the each extension frame extend forward while the each extension frame has a rising inclination toward the seat cushion frame.

5. The seat cushion extension device for the fold-and-dive seat of claim 1, wherein a lower end of each link of the pair of links is hinge-fastened to a front end of a respective one of the pair of seat cushion side frames, and wherein an upper end of the each link is hinge-fastened to a respective one of a pair of support links formed on a bottom surface of the front end of the seat cushion frame.

6. The seat cushion extension device for the fold-and-dive seat of claim 1, wherein each link of the pair of links is arranged to be inclined upward at a predetermined angle toward a rear of the seat cushion extension device while the seat cushion frame and the pair of extension frames are not in a forward extension position.

7. The seat cushion extension device for the fold-and-dive seat of claim 5, wherein the each link pushes up the respective one of the pair of support links of the seat cushion frame and is rotated forward to be arranged to stand upright while the seat cushion frame and the pair of extension frames are in a forward extension position.

8. The seat cushion extension device for the fold-and-dive seat of claim 5, wherein the each link is rotated forward, upon a dive operation of the seat cushion frame and a respective one of the pair of extension frames, to pull down the respective one of the pair of support links and be arranged to be inclined upward at a predetermined angle toward a front of the seat cushion extension device.

9. The seat cushion extension device for the fold-and-dive seat of claim 1, further comprising:
a first motor connected to at least one of the pair of links for a rotation operation of the at least one of the pair of links; and
a second motor for a rotation operation of the seatback frame.

10. The seat cushion extension device for the fold-and-dive seat of claim 9, wherein the first motor comprises a lead screw that is hinge-connected to a fixing bracket mounted on the at least one of the pair of links, wherein the lead screw is a gearbox output shaft of the first motor.

11. The seat cushion extension device for the fold-and-dive seat of claim 9, wherein the second motor comprises a gearbox fastened to a rotational shaft rotatably connecting the seatback frame to the pair of seat cushion side frames so as to apply a rotational force.

12. The seat cushion extension device for the fold-and-dive seat of claim 9, further comprising a controller configured to, at any given time, drive only:
the first motor for an extension operation of the seat cushion frame, or
the second motor for a reclining operation of the seatback frame.

13. The seat cushion extension device for the fold-and-dive seat of claim 9, further comprising a controller configured to simultaneously drive the first motor and the second motor for implementing a fold-and-dive operation and a relaxation posture.

* * * * *